Sept. 19, 1939.  J. W. GALLO  2,173,253
DISPENSING DEVICE
Filed Sept. 20, 1938
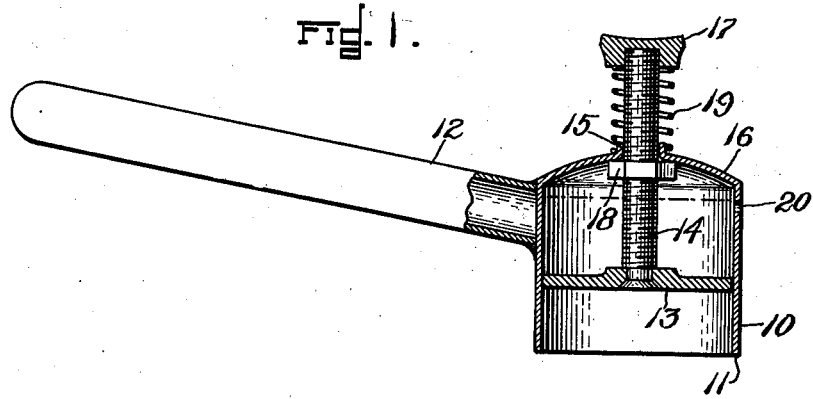
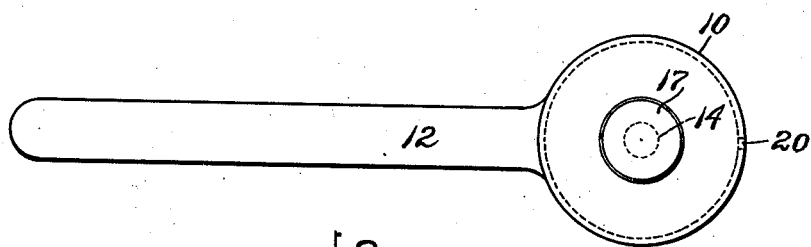
INVENTOR.
John W. Gallo
BY
Arthur F. Randall
ATTORNEY.

Patented Sept. 19, 1939

2,173,253

UNITED STATES PATENT OFFICE 2,173,253

DISPENSING DEVICE

John W. Gallo, Mineola, N. Y., assignor of one-half to Louis H. Segel, Everett, Mass.

Application September 20, 1938, Serial No. 230,833

1 Claim. (Cl. 107—48)

My invention relates to improvements in dispensing devices or utensils for use in serving measured quantities of foodstuff such, for example, as butter, ice cream, mashed potatoes, and the like.

The invention has for its object to provide an improved device of the class described which will be of simple, efficient and inexpensive construction and which can be conveniently controlled and operated by one hand.

To these ends I have provided an improved dispensing device having the features of construction and mode of operation set forth in the following description, the novel features of the invention being separately pointed out and defined in the claim at the close thereof.

In the accompanying drawing:

Figure 1 is a side elevation, partly in section, of a dispensing device constructed in accordance with this invention.

Figure 2 is a top plan view of the device shown in Fig. 1.

The illustrated embodiment of my invention is particularly designed for use in dispensing measured portions of butter and the like and is in the form of a ladle or scoop comprising a cup-shaped interiorly cylindrical vessel 10 having a comparatively sharp chime 11 and a handle 12 projecting laterally from one side thereof.

Within the vessel 10 is a piston 13 in the form of a circular disk fastened to one end of a threaded piston rod 14 which extends upwardly therefrom through a centrally disposed aperture 15 provided through the arched top wall 16 of vessel 10. At its outer end the piston rod 14 is provided with a head or thumb-piece 17 which is made with a threaded socket into which the upper end of rod 14 is screwed. Between the thumb-piece 17 and the top wall 16 of the vessel 10, and surrounding the rod 14, is a spiral spring 19 which is under compression so that it yieldingly holds the piston 13 normally at the limit of its inward movement.

Adjustably mounted on the rod 14 between piston 13 and the top wall 16 of the vessel 10 is a stop nut 18 which engages the inner side of the top wall to limit the inward movement of the piston under the influence of the spring. Movement of the piston in the opposite direction is limited by the spring 19 when the latter is fully compressed and when the spring is in this condition the outer face of the piston is about opposite the chime of the vessel. Should it be desired to dispense with the spring 19 then the outward movement of the piston will be limited by the engagement of thumb-piece 17 with the end wall 16 of the vessel 10. The stop nut 18 is adjusted and set on the rod 14 in accordance with the desired size of the portions which are to be dispensed and this adjustment can be made by first removing thumb-piece 17 and spring 19 and then withdrawing the piston from the vessel, adjusting nut 18, and then re-assembling the parts. Or the nut 18 may be adjusted without disassembling the parts by rotation of finger-piece 17 and piston rod 14, the corners of the nut 18 being pressed firmly against the inside of top 16 by the spring 19 supplemented, if desired, by outward pull upon the finger-piece 17. In other words, the upwardly directed force applied to piston rod 14 while it is being rotated causes the nut 18 to clutch the inner surface of top 16 so that it is held stationary by the latter while the rod 14 is rotated to adjust the nut and rod relatively. The nut 18 is made to fit the threaded rod tightly enough to prevent accidental rotative displacement thereof on rod 14 while the device is in use.

In using the above described portion-dispensing device the handle 12 is grasped by one hand and the butter or other foodstuff is loaded into the open end of the vessel by a downward scooping motion of the device and excess butter or the like is removed from the mouth of the vessel 10 by pressing or scraping the same against the dish holding the butter or the like. The measured portion within the vessel is then delivered where desired by pressure on thumb-piece 17. Owing to the relative disposition of piston rod 14 and handle 12 this piston-operating pressure is conveniently imposed by applying the thumb of the same hand which grasps the handle to the thumb-piece 17 and pressing downwardly thereon.

A vent hole 20 may be formed through the side wall of the vessel adjacent to the inner end thereof to permit unimpeded movement of the piston in both directions.

As herein illustrated the vessel 10 together with its handle 12 may be formed from sheet metal with the handle welded, soldered or otherwise secured to the side of the vessel. Also, the piston, its rod, the nut 18, thumb-piece 17 and spring 19 may, if desired, be metal also. I also contemplate molding this device from plastic materials, particularly the vessel 10 and handle 12 which in that case would be integral. In addition the piston 13 and its rod 14 may be molded in one piece from plastic material.

What I claim is:

A dispensing device of the character described comprising an interiorly cylindrical cup-like vessel having a thin chime at its lower open end and an arched top wall at its opposite end made with a centrally disposed aperture, said vessel being also made upon its exterior with a laterally projecting handle; a circular disk piston movable back and forth and rotatively within said vessel; a threaded piston rod extending from said piston loosely through said aperture to the exterior of said vessel; a thumb-piece at the outer extremity of said rod; a compression spring whose one end abuts said thumb-piece and whose opposite end abuts said top wall, said spring yieldingly urging said piston toward the limit of its inward movement, and a threaded stop nut within said vessel adjustably mounted on said rod and co-operating with said wall to limit the extent of inward movemen of said piston, the said thumb-piece occupying a position where it is accessible for operation by the thumb of the hand grasping said handle and rotation of said piston rod and piston while said nut is held against said top wall serving to adjust said nut on said rod.

JOHN W. GALLO.